Figure 1:
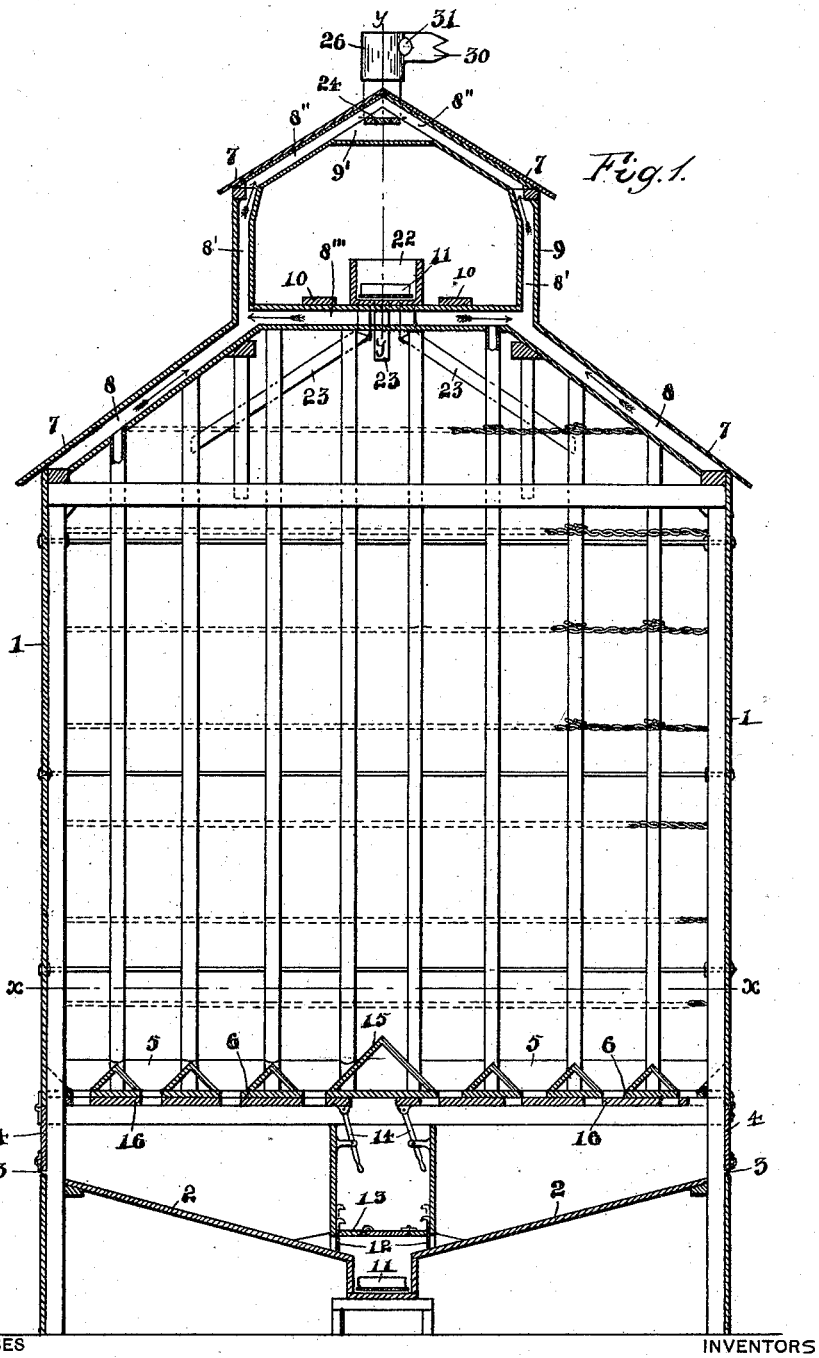

(No Model.) 2 Sheets—Sheet 1.

W. R. VANDERVEER & C. F. SHEDD.
GRAIN DRIER AND VENTILATOR.

No. 470,607. Patented Mar. 8, 1892.

WITNESSES
Arch. M. Catlin.
Evans Blake

INVENTORS
Walter R. Vanderveer
Charles F. Shedd
by Benj. R. Catlin atty

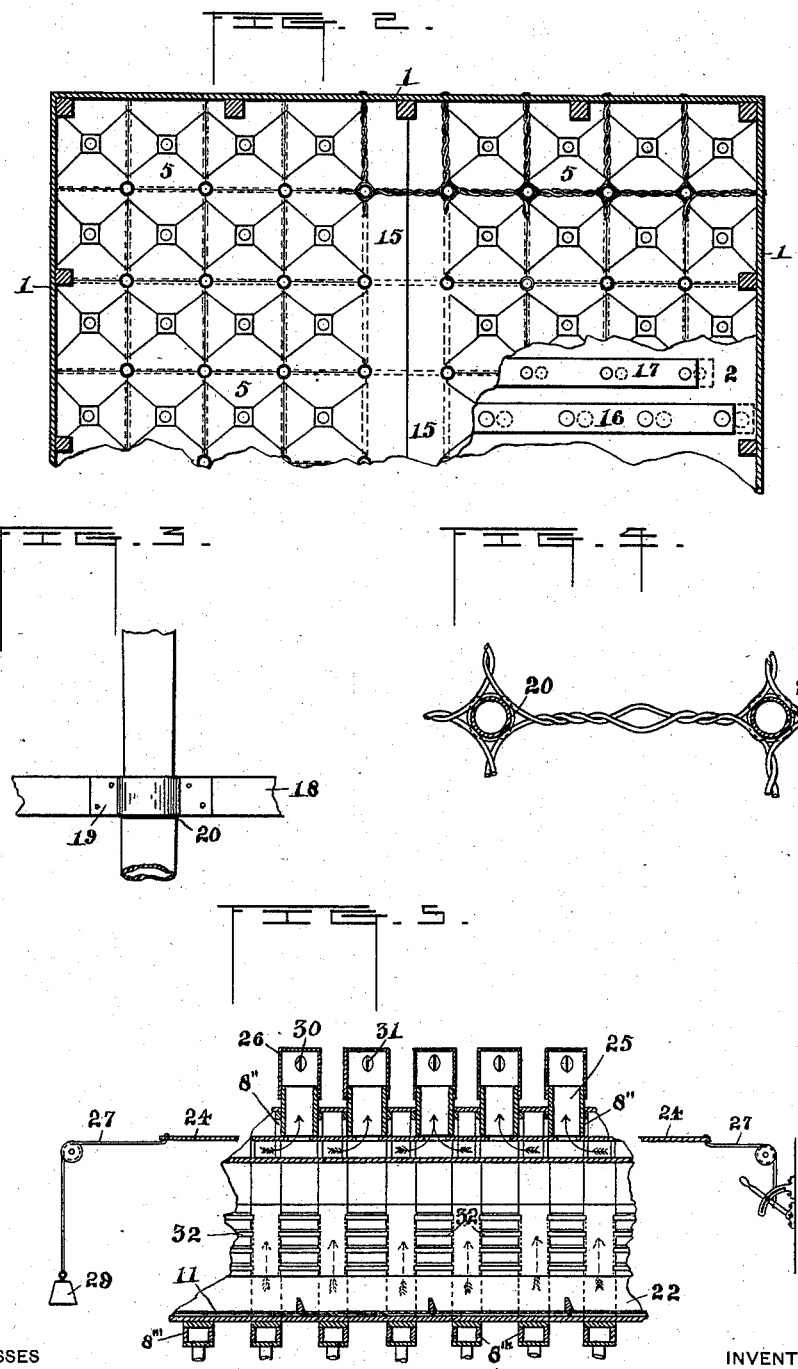

United States Patent Office.

WALTER R. VANDERVEER, OF McCOOL JUNCTION, AND CHARLES F. SHEDD, OF FAIRFIELD, NEBRASKA.

GRAIN DRIER AND VENTILATOR.

SPECIFICATION forming part of Letters Patent No. 470,607, dated March 8, 1892.

Application filed July 14, 1891. Serial No. 399,456. (No model.)

*To all whom it may concern:*

Be it known that we, WALTER R. VANDERVEER, a resident of McCool Junction, in the county of York and State of Nebraska, and CHARLES F. SHEDD, a resident of Fairfield, in the county of Clay and State of Nebraska, have invented certain new and useful Improvements in Grain Driers and Ventilators; and we do hereby declare the following to be a full, clear, and exact description of the invention, such as will enable others skilled in the art to which it pertains to make and use the same.

The object of the invention is to provide efficient means for drying and ventilating grain; and the invention consists in the construction hereinafter described and particularly pointed out.

In the accompanying drawings, Figure 1 is a vertical section of a grain-ventilating building. Fig. 2 is a partial horizontal section on line $xx$ of Fig. 1. Figs. 3 and 4 are details, and Fig. 5 is a partial section on line $yy$ of Fig. 1.

Numeral 1 denotes a grain drying and ventilating building or elevator, which may have a basement below or partly below the ground-surface, if desired.

2 denotes hoppers or bins adapted to receive grain introduced therein in any usual or convenient manner.

3 denotes ventilating-openings provided with doors 4.

The hoppers or bins 2 are located beneath a series of small hoppers 5 in the floor 6, extending across the elevator. Adjacent to these small hoppers are vertically-arranged pipes, made of unglazed tile pipes, which are supported upon said floors 6 over openings therein, preferably at points between the hoppers 5. They are suitably sustained on said floor, so as to communicate freely through suitable valved openings with the space underneath it. The tile pipes extend to the upper part of the building and communicate mediately with the open air. Those at the several sides and under the roofs 7 7 open into flues 8 8, formed by rafters and the weather-boarding, which flues communicate with vertical flues 8' at the sides of the cupola 9. Flues 8' communicate with flues 8'', formed between the rafters of the cupola, and the latter flues discharge into a space 9' just under the ridge of the cupola-roof, and this space normally communicates with the open air through short chimneys 25. 24 indicates a perforated slide adapted to cover and uncover the bottoms of the said chimneys 25, which normally communicate with the flues between the rafters 8. This slide is operated by a cord 27 and lever 28. This cord and lever may be arranged to be operated from within the cupola or from the ground or elsewhere. Weight 29 may normally move the slide to open the communication between the flues and chimneys. To close the same, the lever can be used and locked in position as long as desired. By closing the passages leading to the chimneys circulation of air therethrough can be prevented when the atmosphere is damp and the tile pipes are likely to absorb moisture therefrom.

26 are chimney-cowls provided with vanes 30 and having outlets 31. These cowls may be of any desired kind.

32 32 denote cupola-ventilators of usual form. The centrally-situated tile pipes open directly into flues 8''' in the lower part of the cupola and, as shown in the present instance, at a level below a walk 10.

11 indicates a conveyer adapted to convey away the grain discharged from the hoppers 2.

12 are sliding doors for closing the hopper discharge-openings. These have handles extending above the floor 13 of a passage-way located between the hoppers 2, which floor is provided with one or more trap-doors to give access to the space below for repairing or other purposes.

14 14 indicate levers adapted to operate sliding bottoms 16 under the hoppers 5, whereby the discharge of grain therefrom can be regulated or prevented.

17 17 indicate perforated slides adapted to cover and uncover the bottom of the tiles. These slides, which may be operated in any convenient manner, are used to exclude air from the bottoms of the tiles in damp weather, and, together with slides 24, enable the draft to be entirely cut off and all outside air shut out.

15 is a deflector over the passage-way and above floor 6. The floor-hoppers 5 are omitted at this point, and the object of the deflector 15 above the floor is to divert the descending grain laterally.

The tile pipes are connected to each other and stayed to the building by transversely-arranged wires. These can be used in duplicate and twisted together to inclose the tile, or single wires may be employed.

In Fig. 3 is shown a band 18, employed for the same purpose. The main part of the band is bent partially around the tile and a supplementary piece 19 passed about its opposite side and secured to the band. The band or the wire is preferably kept at its proper level by a shoulder 20, formed on the exterior of the tile. Neither the band nor the wire will seriously impede the downward movement of the grain or the escape of moisture.

The above-described hoppers are preferably made quadrangular in cross-section and the tile pipes located at the top of their intersecting sides, and the wires extending between the tile pipes located immediately over the dividing-line between hoppers, whereby the least possible obstruction is prevented to descending grain, though this is not essential to all the advantages of the improvement. The tile pipes, if three or four inches in diameter, are preferably arranged about sixteen inches apart. They may be used four, six, or more inches in diameter and arranged at greater distances apart.

11 and 22 denote conveyers, and 23 are chutes for distributing the grain among the tiles, which chutes are supplied by the upper conveyer.

In operation grain is elevated to the upper part of the structure by any usual means and distributed through chutes 23 to all parts of the space around the tiles. These being unglazed and porous absorb moisture from damp grain, which moisture passes through to the interior surface of said tiles, and is there taken up by ascending currents of air and carried to the open air. The grain is permitted to descend through hoppers 5 more or less rapidly, as found desirable, and it can be conveyed to the top of the structure and passed through it again, or it can be entirely removed, as circumstances require.

We are aware that porous pipes have been used in grain-driers, and that the use of both horizontally and vertically arranged conveyers is common, and our improvements are hereinafter particularly pointed out.

Having thus described our invention, what we desire to secure by Letters Patent is—

1. A grain-drying structure having a cupola 9, provided with a conveyer and with a floor or walk for an attendant, vertical tile pipes for ventilating the grain, horizontal flue 8''', and the vertical flues 8' and flues 8'', said flues 8' and 8'' being formed in the wall and roof, respectively, of the cupola, whereby the floor and wall space are utilized for flues and means are afforded for inspection and care of the grain in the conveyer, substantially as set forth.

2. In a grain-drying structure having a cupola, the vertical tile pipes, the communicating flues 8''' and 8'', and the chimneys provided with movable cowls having weather-vanes, said flues being arranged in the floor, exterior walls, and roof of the cupola and communicating with the cowls, whereby the floor, wall, and roof of the cupola are utilized for flues and draft therethrough is promoted, substantially as set forth.

3. In a structure for drying and ventilating grain, the floor provided with hoppers, the bins below said floor, the passage-way between said bins and below the hopper-floor, spouts leading to a space below the floor of the passage-way, devices for opening and closing the hoppers, and devices for opening and closing the spouts of the bins, all of said devices extending into the passage-way, substantially as set forth.

4. In a structure for drying and ventilating grain, the floor provided with hoppers, the bins below said floor, the passage-way between said bins having spouts leading to a space below the floor of the passage-way, devices for opening and closing the hoppers, and devices for opening and closing the spouts of the bins, all of said devices extending into the passage-way, a conveyer adapted to raise grain from below the floor of the passage-way to the upper part of the structure, and a door in said floor, whereby the condition of the grain can be inspected and the operation of the apparatus conveniently controlled, substantially as set forth.

In testimony whereof we have signed this specification in the presence of the subscribing witnesses.

WALTER R. VANDERVEER.
CHARLES F. SHEDD.

Witnesses:
A. B. CHRISTIAN,
RALPH STANLEY,
ELY WRIGHT,
JAMES BRADER.